Patented May 16, 1950

2,507,518

UNITED STATES PATENT OFFICE 2,507,518

HALOGENOSILAHYDROCARBONS AND THEIR PRODUCTION

John T. Goodwin, Jr., Midland, Mich., assignor to Dow Corning Corporation, Midland, Mich., a corporation of Michigan No Drawing. Application March 19, 1949, Serial No. 82,475

9 Claims. (Cl. 260—448.2)

The present invention relates to new organosilicon compositions, and to their methods of production.

The present organosilicon industry is based upon siloxanes which are materials in which the silicon atoms are linked through oxygen atoms. Another type of compound is one in which the silicon atoms are linked directly to each other. Still a third type is one in which the silicon atoms are linked by organic radicals. The literature presents very little information about this last type of compound.

Objects of the present invention are to produce organosilicon compounds in which the silicon atoms are linked by methylene radicals. Other objects and advantages of the present invention will be apparent from the following description, and the subjoined claims.

The compounds hereof are of the type $$[R_3SiCH_2]_nSiX_{4-n}$$

where each X represents a halogen atom, each R represents a radical of the group consisting of alkyl and monocyclic aryl radicals and $n$ represents an integer from 1 to 2 inclusive. Thus, each R may be an alkyl radical as from methyl to octadecyl or a monocyclic aryl radical such as phenyl or tolyl. Specific type compounds in accord herewith are of the formulae $R_3SiCH_2SiX_3$ and $[R_3SiCH_2]_2SiX_2$.

The compounds in accord herewith are produced by reacting a compound of the type $SiX_4$, where each X represents a halogen atom with a reagent of the group consisting of $R_3SiCH_2MgX$ and $R_3SiCH_2Li$ where each R represents a radical of the group consisting of alkyl and monocyclic aryl radicals.

The organolithium compound, $R_3SiCH_2Li$ may be prepared by gradually adding $R_3SiCH_2X$ to a finely divided suspension of lithium in mineral oil.

The Grignard reagent, $R_3SiCH_2MgX$, may be prepared by reacting magnesium with chloromethyltrimethylsilane.

To assure a high yield of the desired product, $R_3SiCH_2SiX_3$, the organometallic compound is employed in proportion of 0.5 to less than 3 molar equivalents per mol of silicon tetrahalide. Preferably equimolecular amounts are employed. When a low ratio of silicon tetrachloride to the other reactant is employed disubstitution is obtained. There are thereby produced compounds of the type $[(CH_3)_3SiCH_2]_2SiCl_2$. 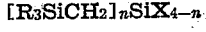 This compound may be hydrolyzed and the hydrolyzate copolymerized with octamethylcyclotetrasiloxane to produce fluids having a low pour point for such purposes as hydraulic fluids. The reaction in accord herewith may be carried out by mixing the reagent of the group consisting of $R_3SiCH_2Li$ and $R_3SiCH_2MgX$ with the silicon tetrahalide compound. The resulting product may be purified by filtering and distilling if desired.

The products hereof are of substantial utility as intermediates in the production of other organosilicon compositions. The products hereof are of utility in the production of soluble siloxane polymers which may be thermally set to resinous solids. Thus, the compounds of the present invention may be hydrolyzed and condensed alone to produce such resins. Also, the compounds of the present invention may be hydrolyzed and condensed in mixture with other organosilicon chlorides to produce organosiloxanes. When cohydrolyzed and condensed with a triorganosilicon halide stable fluids are obtained. When hydrolyzed with a mono or diorgano-silicon halide, siloxanes are obtained which may be condensed to resinous solids. These resins are of utility in formulating heat and weather resistant coatings for boilers, stacks, ovens, and other hot metal surfaces.

The following examples illustrate the methods of the present invention.

Example 1

$(CH_3)_3SiCH_2MgCl$ was prepared by reacting 245 parts by weight of $(CH_3)_3SiCH_2Cl$ with 48 parts of magnesium in ethyl ether. The Grignard reagent so prepared was reacted with 680 parts of silicon tetrachloride by pouring it into $SiCl_4$. The reactants coupled readily at room temperature. The coupled product was filtered, and the filtrate transferred to the stripping still. The ether was stripped off. Distillation yielded 255 parts of the compound $(CH_3)_3SiCH_2SiCl_3$ in a yield of 64.7 percent. The compound had a boiling point of 165.8° C. at atmospheric pressure, a density of 1.1234 at 25° C., a refractive index of 1.4448 at 25° C., and a specific refraction of 0.2368.

When a mixture of 149.5 parts of $CH_3SiCl_3$, 221.5 parts of $(CH_3)_3SiCH_2SiCl_3$ and 191 parts of $C_6H_5CH_3SiCl_2$ is gradually added during one-half hour to 635 parts of toluene in 1168 parts of $H_2O$, hydrolysis occurs with the separation of a water insoluble layer. This organic layer is then separated and shaken with $NaHCO_3$. It is then washed, filtered, and concentrated to 35% solids. The resulting composition will be upon drying a tough, flexible resin.

Example 2

When silicon tetrachloride in amount of 170 parts by weight is gradually added over a period of one hour to 84 parts of the organolithium compound, $(CH_3)_3SiCH_2Li$, dissolved in pentane, coupling occurs with the production of $$(CH_3)_3SiCH_2SiCl_3.$$

When 775.3 parts of this product is mixed with 971.8 parts of $CH_3SiCl_3$, added to 1710 parts of toluene, and the resulting solution added to 338 parts of $H_2O$ in 270 parts of isopropyl alcohol, hydrolysis occurs with phase separation. The reaction mixture is decanted. The water insoluble layer is refluxed for 2 hours and then washed. It is then concentrated to 35% solids. The resulting composition upon drying will be a tough, flexible resin.

Example 3

32 parts by weight of magnesium and 300 parts of ethyl ether were mixed, and 239.9 parts of $C_6H_5(CH_3)_2SiCH_2Cl$ added to the mixture. 700 parts of ethyl ether were then added and the mixture stirred. The resulting Grignard reagent was $C_6H_5(CH_3)_2SiCH_2MgCl$.

1000 parts of toluene and 500 parts of $SiCl_4$ were mixed and the Grignard reagent $$C_6H_5(CH_3)_2SiCH_2MgCl$$

added. The reaction mixture was stirred overnight. The reaction mass was filtered and stripped of toluene. The residue was distilled, and 177 parts of the product $$C_6H_5(CH_3)_2SiCH_2SiCl_3$$

was obtained. This compound was found to have a boiling point of 146° C. at 20 mm., a refractive index of 1.5174 at 25° C., a density of 1.187 at 25° C. and a specific refraction of 0.3028.

That which is claimed is:

1. Compositions of the formula $$[R_3SiCH_2]_nSiX_{4-n}$$

in which each R represents a radical of the group consisting of alkyl and monocyclic aryl radicals, each X represents a halogen atom, and $n$ is an integer from 1 to 2 inclusive.

2. Compositions in accordance with claim 1 in which each R represents methyl.

3. Compositions in accordance with claim 1 in which each R represents a radical of the group consisting of methyl and phenyl radicals and which compound contains both methyl and phenyl radicals.

4. Compositions in accord with claim 1 in which $n$ is equal to 1.

5. Compositions in accord with claim 1 in which $n$ is equal to 2.

6. $C_6H_5(CH_3)_2SiCH_2SiCl_3$.

7. $(CH_3)_3SiCH_2SiCl_3$.

8. The method which comprises reacting a compound of the group consisting of $$R_3SiCH_2MgX$$

and $R_3SiCH_2Li$ where each R represents a radical of the group consisting of alkyl and monocyclic aryl radicals and X represents a halogen atom, with a compound of the type $SiX_4$, there being present at least 0.5 and less than 3 mols of the former per mol of the latter, whereby a product of the formula $[R_3SiCH_2]_nSiX_{4-n}$, where $n$ is an integer from 1 to 2 inclusive, is obtained.

9. The method in accordance with claim 8 in which each R represents methyl.

JOHN T. GOODWIN, Jr.

REFERENCES CITED

The following references are of record in the file of this patent:

UNITED STATES PATENTS

| Number | Name | Date |
|---|---|---|
| 2,444,358 | Speier | July 6, 1948 |
| 2,452,895 | Bluestein | Nov. 12, 1948 |

OTHER REFERENCES

Sommer, "Jour. Am. Chem. Soc.," vol. 69 (1947), page 980.

Goodwin, "Jour. Am. Chem. Soc.," vol. 69 (1947), page 2247.

Bluestein—"Jour. Am. Chem. Soc.," vol. 70 (1948), pages 3068–3071.